United States Patent
Segall et al.

(10) Patent No.: US 8,409,654 B2
(45) Date of Patent: Apr. 2, 2013

(54) PRODUCTION OF SOLUBLE SOY PROTEIN PRODUCT FROM SOY PROTEIN MICELLAR MASS ("S300/S200")

(75) Inventors: Kevin I. Segall, Winnipeg (CA); Martin Schwetzer, Winnipeg (CA); Brent E. Green, Warren (CA); Sarah Medina, Winnipeg (CA); Brandy Gosnell, Winnipeg (CA)

(73) Assignee: Burcon Nutrascience (MB) Corp., Winnipeg, Manitoba (CA)

( * ) Notice: Subject to any disclaimer, the term of this patent is extended or adjusted under 35 U.S.C. 154(b) by 83 days.

(21) Appl. No.: 12/693,725

(22) Filed: Jan. 26, 2010

(65) Prior Publication Data

US 2010/0221403 A1  Sep. 2, 2010

Related U.S. Application Data

(60) Provisional application No. 61/202,055, filed on Jan. 26, 2009, provisional application No. 61/272,289, filed on Sep. 8, 2009.

(51) Int. Cl.
*A23J 1/00* (2006.01)

(52) U.S. Cl. .......................... 426/656; 530/344; 530/300

(58) Field of Classification Search .................. 426/656; 530/344, 300
See application file for complete search history.

(56) References Cited

U.S. PATENT DOCUMENTS

| 3,736,147 | A | 5/1973 | Iacobucci et al. | |
|---|---|---|---|---|
| 5,844,086 | A | 12/1998 | Murray | |
| 6,005,076 | A | 12/1999 | Murray | |
| 2002/0106437 | A1* | 8/2002 | Karleskind et al. | 426/590 |
| 2004/0086624 | A1* | 5/2004 | Saito et al. | 426/629 |
| 2007/0237877 | A1 | 10/2007 | Diosady et al. | |
| 2009/0175999 | A1* | 7/2009 | Segall et al. | 426/590 |

FOREIGN PATENT DOCUMENTS

| CA | 2445147 | 11/2002 |
|---|---|---|
| CA | 2630606 | 3/2007 |

* cited by examiner

*Primary Examiner* — D. Lawrence Tarazano
*Assistant Examiner* — Tamra L Dicus
(74) *Attorney, Agent, or Firm* — Michael I. Stewart; Sim & McBurney

(57) ABSTRACT

A soy protein product having a protein content of at least 60 wt % (N×6.25) dry weight, preferably a soy protein isolate having a protein content of at least about 90 wt % (N×6.25) d.b., is formed by a soy protein micellar mass production route. The supernatant from the coalesced protein micellar mass may be processed to recover additional quantities of soy protein product. The soy protein product may be used for a fortification of soft drinks and sports drinks.

66 Claims, No Drawings

PRODUCTION OF SOLUBLE SOY PROTEIN PRODUCT FROM SOY PROTEIN MICELLAR MASS ("S300/S200")

REFERENCE TO RELATED APPLICATIONS

This application claims priority under 35 USC 119(e) from U.S. Provisional Patent Application Nos. 61/202,055 filed Jan. 26, 2009 and 61/272,289 filed Sep. 8, 2009.

FIELD OF INVENTION

The invention relates to the production of soybean protein products.

BACKGROUND TO THE INVENTION

In U.S. Provisional Patent Applications Nos. 61/107,112 (7865-373) filed Oct. 21, 2008, 61/193,457 (7865-374) filed Dec. 2, 2008, 61/202,070 (7865-376) filed Jan. 26, 2009, 61/202,553 filed Mar. 12, 2009 (7865-383), 61/213,717 (7865-389) filed Jul. 7, 2009, 61/272,241 filed Sep. 3, 2009 and U.S. patent application Ser. No. 12/603,087 filed Oct. 21, 2009 the disclosures of which are incorporated herein by reference, there is described the preparation of a soy protein product, preferably a soy protein isolate, which is completely soluble and is capable of providing transparent and heat stable solutions at low pH values. This soy protein product may be used for protein fortification of, in particular, soft drinks and sports drinks, as well as other acidic aqueous systems, without precipitation of protein. The soy protein product is produced by extracting a soy protein source with aqueous calcium chloride solution at natural pH, optionally diluting the resulting aqueous soy protein solution, adjusting the pH of the aqueous soy protein solution to a pH of about 1.5 to about 4.4, preferably about 2.0 to about 4.0, to produce an acidified clear soy protein solution, which may be optionally concentrated and/or diafiltered before drying.

SUMMARY OF THE INVENTION

It has now been found that process streams derived from the precipitation of a soy protein micellar mass may be further processed to provide soy protein products having a protein content of at least about 60 wt % (N×6.25) d.b. that are soluble in acidic media and produce transparent, heat stable solutions at low pH values, and, therefore which may be used for protein fortification of, in particular, soft drinks and sports drinks, as well as other aqueous systems, without precipitation of protein. The soy protein product is preferably an isolate having a protein content of at least about 90 wt %, preferably at least about 100 wt % (N×6.25) d.b.

In accordance with one aspect of the present invention, there is provided a process of preparing a soy protein product having a protein content of at least about 60 wt % (N×6.25) on a dry weight basis, which comprises:

adding calcium salt or other divalent salt, preferably calcium chloride, to supernatant from the precipitation of a soy protein micellar mass to provide a conductivity of about 2 mS to about 30 mS, preferably about 8 to about 15 mS, removing precipitated phytate material from the resulting solution to leave a clear solution, optionally adjusting the pH of the clear solution to about 1.5 to about 4.4, preferably about 2.0 to about 4.0, such as by the addition of hydrochloric acid, concentrating the optionally pH-adjusted clear solution to a protein content of about 50 to about 400 g/L, preferably about 100 to about 250 g/L to produce a clear concentrated soy protein solution, optionally diafiltering the clear soy protein solution, before or after complete concentration, such as with about 2 to about 40 volumes of water, preferably about 5 to about 25 volumes of water, optionally effecting a colour removal step, such as a granular activated carbon treatment, and drying the concentrated protein solution.

The supernatant may be partially concentrated to an intermediate concentration prior to addition of the calcium salt. The precipitate which forms is removed and the resulting solution is optionally acidified as described above, further concentrated to the final concentration and then optionally diafiltered and dried.

Alternatively, the supernatant first may be concentrated to the final concentration, the calcium salt is added to the concentrated supernatant, the resulting precipitate is removed and the solution is optionally acidified and then optionally diafiltered and dried.

It is an option in the above-described procedures to omit the acidification and effect processing of the solution at natural pH. In this option calcium salt is added to supernatant, partially concentrated supernatant or concentrated supernatant to form a precipitate which is removed. The resulting solution then is processed as described above without the acidification step.

Where the supernatant is partially concentrated prior to the addition of the calcium salt and fully concentrated after removal of the precipitate, the supernatant is first concentrated to a protein concentration of about 50 g/L or less, and, after removal of the precipitate, then is concentrated to a concentration of about 50 to about 400 g/L, preferably about 100 to about 250 g/L.

The soy protein product preferably is an isolate having a protein content of at least about 90 wt %, preferably at least about 100 wt % (N×6.25) d.b.

In another aspect of the invention, we have found that an equivalent product may be produced from soy by the processing of soy protein solution from sodium salt extraction of the soy protein source material, by concentrating the soy protein solution, optionally diafiltering the concentrated soy protein solution, optionally adjusting the pH of the solution to about 2 to about 4, and drying the acidified solution. According to this aspect of the present invention, there is provided a process of preparing a soy protein product having a protein content of at least about 60 wt % (N×6.25) dry weight, which comprises:

extracting a soy protein source to solubilize soy protein in the source material and to form an aqueous soy protein solution having a pH of about 5 to about 7, concentrating the aqueous soy protein solution to a concentration of about 50 to about 400 g/L to form a concentrated soy protein isolate, optionally diafiltering the soy protein solution, before or after complete concentration thereof, optionally adjusting the pH of the concentrated and diafiltered soy protein solution to about 2 to about 4 to provide a clear acidified soy protein solution, and drying the soy protein solution.

The soy protein product preferably is an isolate having a protein content of at least about 90 wt %, preferably at least about 100 wt % (N×6.25) d.b.

It has also been found that soy protein isolate formed as a protein micellar mass and soy protein isolate derived from supernatant from protein micellar mass precipitation are soluble in acidic media and may be used to provide aqueous solutions of acceptable clarity.

While the present invention refers mainly to the production of soy protein isolates, it is contemplated that soy protein products of lesser purity may be provided having similar properties to the soy protein isolates. Such lesser purity products may have a protein concentration of at least about 60% by weight (N×6.25) d.b.

The novel soy protein products of the invention can be blended with powdered drinks for the formation of aqueous soft drinks or sports drinks by dissolving the same in water. Such blend may be a powdered beverage.

The soy protein products provided herein may be provided as an aqueous solution thereof having a high degree of clarity at acid pH values and which is heat stable at these pH values.

In another aspect of the present invention, there is provided an aqueous solution of the soy product provided herein which is heat stable at low pH. The aqueous solution may be a beverage, which may be a clear beverage in which the soy protein product is completely soluble and transparent or an opaque beverage in which the soy protein product does not increase the opacity.

The soy protein products produced according to the processes herein lack the characteristic beany flavour of soy protein isolate and are suitable, not only for protein fortification of acidic media, but may be used in a wide variety of conventional applications of protein isolates, including but not limited to protein fortification of processed foods and beverages, emulsification of oils, as a body former in baked goods and foaming agent in products which entrap gases. In addition, the soy protein product may be formed into protein fibres, useful in meat analogs, and may be used as an egg white substitute or extender in food products where egg white is used as a binder. The soy protein product may be used in nutritional supplements. Other uses of the soy protein product are in pet foods, animal feed and in industrial and cosmetic applications and in personal care products.

GENERAL DESCRIPTION OF THE INVENTION

The initial step of the process of providing the soy protein product involves solubilizing soy protein from a soy protein source. The soy protein source may be soybeans or any soy product or by-product derived from the processing of soybeans including but not limited to soy meal, soy flakes, soy grits and soy flour. The soy protein source may be used in the full fat form, partially defatted form or fully defatted form. Where the soy protein source contains an appreciable amount of fat, an oil-removal step generally is required during the process. The soy protein recovered from the soy protein source may be the protein naturally occurring in soybean or the proteinaceous material may be a protein modified by genetic manipulation but possessing characteristic hydrophobic and polar properties of the natural protein.

Protein solubilization may be effected by using a food grade sodium salt solution such as a solution of food grade sodium chloride. Where the soy protein isolate is intended for non-food uses, non-food-grade chemicals may be used. Other monovalent salts also may be used, such as potassium chloride. As the concentration of the salt solution increases, the degree of solubilization of protein from the soy protein source initially increases until a maximum value is achieved. Any subsequent increase in salt concentration does not increase the total protein solubilized. The concentration of the salt solution which causes maximum protein solubilization varies depending on the salt concerned. The choice of concentration of the sodium salt solution is also influenced by the proportion of protein desired to be obtained by the micellar route. Higher salt concentrations, preferably about 0.5 M to about 1.0 M, generally result in more protein micellar mass upon dilution of the concentrated soy protein solution into cold water. The extraction may be carried out with a sodium chloride solution of higher concentration, or alternatively, the extraction can be carried out with a solution of less than 0.5 M sodium chloride, for example, 0.10 M or 0.15 M sodium chloride, and then additional salt may be added to the soy protein solution after removal of the soy protein source.

In a batch process, the salt solubilization of the protein is effected at a temperature of from about 1° C. to about 100° C., preferably about 15° C. to about 35° C., preferably accompanied by agitation to decrease the solubilization time, which is usually about 1 to about 60 minutes. It is preferred to effect the solubilization to extract substantially as much protein from the soy protein source as is practicable, so as to provide an overall high product yield.

In a continuous process, the extraction of the protein from the soy protein source is carried out in any manner consistent with effecting a continuous extraction of protein from the soy protein source. In one embodiment, the soy protein source is continuously mixed with a food grade salt solution and the mixture is conveyed through a pipe or conduit having a length and at a flow rate for a residence time sufficient to effect the desired extraction in accordance with the parameters described herein. In such continuous procedure, the salt solubilization step is effected rapidly, in a time of up to about 10 minutes, preferably to effect solubilization to extract substantially as much protein from the soy protein source as is practicable. The solubilization in the continuous procedure is effected at temperatures between about 1° C. and about 100° C., preferably between about 15° C. and about 35° C.

The extraction may be carried out at the natural pH of the soy protein source/salt solution system, generally about 5 to about 7. Alternatively, the pH of the extraction may be adjusted to any desired value within the range of about 5 to about 7 for use in the extraction step by the use of any convenient acid, usually hydrochloric acid, or alkali, usually sodium hydroxide, as required.

The concentration of the soy protein source in the food grade salt solution during the solubilization step may vary widely. Typical concentration values are about 5 to about 15% w/v.

The protein extraction step with the aqueous salt solution has the additional effect of solubilizing fats which may be present in the soy protein source, which then results in the fats being present in the aqueous phase.

The protein solution resulting from the extraction step generally has a protein concentration of about 5 to about 50 g/L, preferably about 10 to about 50 g/L.

The aqueous salt solution may contain an antioxidant. The antioxidant may be any convenient antioxidant, such as sodium sulfite or ascorbic acid. The quantity of antioxidant employed may vary from about 0.01 to about 1 wt % of the solution, preferably about 0.05 wt %. The antioxidant serves to inhibit the oxidation of any phenolics in the protein solution.

The aqueous phase resulting from the extraction step then may be separated from the residual soy protein source, in any convenient manner, such as by employing a decanter centrifuge, followed by disc centrifugation and/or filtration to remove residual soy protein source material. The separated residual soy protein source may be dried for disposal. Alternatively, the separated residual soy protein source may be processed to recover some residual protein, such as by a conventional isoelectric precipitation procedure or any other convenient procedure to recover such residual protein.

Where the soy protein source contains significant quantities of fat, as described in U.S. Pat. Nos. 5,844,086 and 6,005,076, assigned to the assignee hereof and the disclosures of which are incorporated herein by reference, then the defatting steps described therein may be effected on the separated aqueous protein solution. Alternatively, defatting of the separated aqueous protein solution may be achieved by any other convenient procedure.

The aqueous soy protein solution may be treated with an adsorbent, such as powdered activated carbon or granulated activated carbon, to remove colour and/or odour compounds. Such adsorbent treatment may be carried out under any convenient conditions, generally at the ambient temperature of the separated aqueous protein solution. For powdered activated carbon, an amount of about 0.025% to about 5% w/v, preferably about 0.05% to about 2% w/v, is employed. The adsorbing agent may be removed from the soy protein solution by any convenient means, such as by filtration.

As an alternative to extracting the soy protein source with an aqueous salt solution, such extraction may be made using water alone. Where such alternative is employed, then the salt, in the concentrations discussed above, may be added to the protein solution after separation from the residual soy protein source. When a first fat removal step is carried out, the salt generally is added after completion of such operations.

Another alternative procedure is to extract the soy protein source with the food grade salt solution at a relatively high pH value above about 7, generally up to about 11. The pH of the extraction system may be adjusted to the desired alkaline value by the use of any convenient food-grade alkali, such as aqueous sodium hydroxide solution. Alternatively, the soy protein source may be extracted with the salt solution at a relatively low pH below about pH 5, generally down to about pH 3. The pH of the extraction system may be adjusted to the desired acidic value by the use of any convenient food grade acid such as hydrochloric or phosphoric acid. Where such alternative is employed, the aqueous phase resulting from the soy protein source extraction step then is separated from the residual soy protein source, in any convenient manner, such as by employing decanter centrifugation, followed by disc centrifugation and/or filtration to remove residual soy protein source. The separated residual soy protein source may be dried for disposal or further processed to recover residual protein, as discussed above.

The aqueous soy protein solution resulting from the high or low pH extraction step then is pH adjusted to the range of about 5 to about 7, as discussed above, prior to further processing as discussed below. Such pH adjustment may be effected using any convenient acid, such as hydrochloric acid, or alkali, such as sodium hydroxide, as appropriate. If necessary, the protein solution may be clarified by any convenient procedure such as centrifugation or filtration after the pH adjustment and prior to further processing.

If of adequate purity, the resulting aqueous soy protein solution may be directly dried to produce a soy protein product. To decrease the impurities content, the aqueous soy protein solution may be processed prior to drying.

The aqueous soy protein solution may be concentrated to increase the protein concentration thereof while maintaining the ionic strength thereof substantially constant. Such concentration generally is effected to provide a concentrated protein solution having a protein concentration of about 50 g/L to about 400 g/L, preferably about 100 to about 250 g/L.

The concentration step may be effected in any convenient manner consistent with batch or continuous operation, such as by employing any convenient selective membrane technique, such as ultrafiltration or diafiltration, using membranes, such as hollow-fibre membranes or spiral-wound membranes, with a suitable molecular weight cut-off, such as about 3,000 to about 1,000,000 daltons, preferably about 5,000 to about 100,000 daltons, having regard to differing membrane materials and configurations, and, for continuous operation, dimensioned to permit the desired degree of concentration as the aqueous protein solution passes through the membranes.

As is well known, ultrafiltration and similar selective membrane techniques permit low molecular weight species to pass through the membrane while preventing higher molecular weight species from so doing. The low molecular weight species include not only the ionic species of the food grade salt but also low molecular weight materials extracted from the source material, such as, carbohydrates, pigments, low molecular weight proteins and anti-nutritional factors, such as trypsin inhibitors, which are themselves low molecular weight proteins. The molecular weight cut-off of the membrane is usually chosen to ensure retention of a significant proportion of the protein in the solution, while permitting contaminants to pass through having regard to the different membrane materials and configurations.

The protein solution may be subjected to a diafiltration step, before or after complete concentration, preferably using an aqueous salt solution of the same molarity and pH as the extraction solution. If a reduction in the salt content of the retentate is desired, the diafiltration solution employed may be an aqueous salt solution at the same pH but lower salt concentration than the extraction solution. However, the salt concentration of the diafiltration solution must be chosen so that the salt level in the retentate remains sufficiently high to maintain the desired protein solubility. Diafiltration may be effected using from about 2 to about 40 volumes of diafiltration solution, preferably about 5 to about 25 volumes of diafiltration solution. In the diafiltration operation, further quantities of contaminants are removed from the aqueous protein solution by passage through the membrane with the permeate. The diafiltration operation may be effected until no significant further quantities of contaminants or visible colour are present in the permeate. If the retentate is to be dried without further processing, according to one aspect of the present invention, then diafiltration may be conducted until the retentate has been sufficiently purified so as, when dried, to provide the desired protein concentration, preferably to provide an isolate with a protein content of at least about 90 wt % (N×6.25) on a dry basis. Such diafiltration may be effected using the same membrane as for the concentration step. However, if desired, the diafiltration step may be effected using a separate membrane with a different molecular weight cut-off, such as a membrane having a molecular weight cut-off in the range of about 3,000 to about 1,000,000 daltons, preferably about 5,000 to about 100,000 daltons, having regard to different membrane materials and configuration.

The concentration step and the diafiltration step may be effected herein in such a manner that the soy protein product subsequently recovered by drying the concentrated and diafiltered retentate contains less than about 90 wt % protein (N×6.25) d.b., such as at least about 60 wt % protein (N×6.25) d.b. By partially concentrating and/or partially diafiltering the aqueous soy protein solution, it is possible to only partially remove contaminants. This protein solution may then be dried to provide a soy protein product with lower levels of purity. The soy protein product is still able to produce clear protein solutions under acidic conditions.

An antioxidant may be present in the diafiltration medium during at least part of the diafiltration step. The antioxidant may be any convenient antioxidant, such as sodium sulfite or ascorbic acid. The quantity of antioxidant employed in the diafiltration medium depends on the materials employed and may vary from about 0.01 to about 1 wt %, preferably about 0.05 wt %. The antioxidant serves to inhibit the oxidation of any phenolics present in the concentrated soy protein solution.

The concentration step and the optional diafiltration step may be effected at any convenient temperature, generally about 2° to about 60° C., preferably about 20° to about 35° C., and for the period of time to effect the desired degree of concentration and diafiltration. The temperature and other conditions used to some degree depend upon the membrane equipment used to effect the membrane processing, the desired protein concentration of the solution and the efficiency of the removal of contaminants to the permeate.

There are two main trypsin inhibitors in soy, namely the Kunitz inhibitor, which is a heat-labile molecule with a molecular weight of approximately 21,000 Daltons, and the Bowman-Birk inhibitor, a more heat-stable molecule with a molecular weight of about 8,000 Daltons. The level of trypsin inhibitor activity in the final soy protein isolate can be controlled by manipulation of various process variables.

For example, the concentration and/or diafiltration steps may be operated in a manner favorable for removal of trypsin inhibitors in the permeate along with the other contaminants. Removal of the trypsin inhibitors is promoted by using a membrane of larger pore size, such as about 30,000 to about 1,000,000 Da, operating the membrane at elevated temperatures, such as about 30 to about 60° C. and employing greater volumes of diafiltration medium, such as about 20 to about 40 volumes.

Further, a reduction in trypsin inhibitor activity may be achieved by exposing soy materials to reducing agents that disrupt or rearrange the disulfide bonds of the inhibitors. Suitable reducing agents include sodium sulfite, cysteine and N-acetylcysteine.

The addition of such reducing agents may be effected at various stages of the overall process. The reducing agent may be added with the soy protein source material in the extraction step, may be added to the clarified aqueous soy protein solution following removal of residual soy protein source material, may be added to the concentrated protein solution before or after diafiltration or may be dry blended with the dried soy protein product. The addition of the reducing agent may be combined with the membrane processing steps, as described above.

If it is desired to retain active trypsin inhibitors in the concentrated protein solution, this can be achieved by utilizing a concentration and diafiltration membrane with a smaller pore size, operating the membrane at lower temperatures, employing fewer volumes of diafiltration medium and not employing a reducing agent.

The concentrated and optionally diafiltered protein solution may be subject to a further defatting operation, if required, as described in U.S. Pat. Nos. 5,844,086 and 6,005,076. Alternatively, defatting of the concentrated and optionally diafiltered protein solution may be achieved by any other convenient procedure.

The concentrated and diafiltered aqueous protein solution may be treated with an adsorbent, such as powdered activated carbon or granulated activated carbon, to remove colour and/or odour compounds. Such adsorbent treatment may be carried out under any convenient conditions, generally at the ambient temperature of the concentrated protein solution. For powdered activated carbon, an amount of about 0.025% to about 5% w/v, preferably about 0.05% to about 2% w/v, is employed. The adsorbent may be removed from the soy protein solution by any convenient means, such as by filtration.

The concentrated and optionally diafiltered soy protein solution resulting from the optional defatting and optional adsorbent treatment step may be subjected to a pasteurization step to reduce the microbial load. Such pasteurization may be effected under any desired pasteurization conditions. Generally, the concentrated and optionally diafiltered protein solution is heated to a temperature of about 55° to about 70° C., preferably about 60° to about 65° C., for about 30 seconds to about 60 minutes, preferably about 10 minutes to about 15 minutes. The pasteurized, concentrated protein solution then may be cooled for further processing as described below, preferably to a temperature of about 25° to about 40° C.

In accordance with one aspect of the present invention, the concentrated and diafiltered soy protein solution is dried to yield the soy protein product. Alternatively, the concentrated and diafiltered soy protein solution may be adjusted in pH to a pH of about 2.0 to about 4.0, preferably about 2.9 to about 3.2. The pH adjustment may be effected in any convenient manner, such as by addition of hydrochloric acid or phosphoric acid. The resulting acidified soy protein solution then is dried. As a further alternative, the pH adjusted soy protein solution may be subjected to a heat treatment to inactivate heat labile anti-nutritional factors, such as the trypsin inhibitors mentioned above. Such a heating step also provides the additional benefit of reducing the microbial load. Generally, the protein solution is heated to a temperature of about 70° to about 100° C., preferably about 85° to about 95° C., for about 10 seconds to about 60 minutes, preferably about 30 seconds to about 5 minutes. The heat treated acidified soy protein solution then may be cooled to a temperature of about 2° C. to about 60° C., preferably about 20° to about 35° C. The resulting acidified, heat treated soy protein solution then is dried.

The concentrated and optionally diafiltered protein solution may be raised in ionic strength by salt addition, if desired, to promote the formation of protein micellar mass upon dilution as an alternative to the ionic strength adjustment operation described above.

Depending on the temperature employed in the concentration step and optional diafiltration step and whether or not a pasteurization step is effected, the concentrated protein solution may be warmed to a temperature of at least about 20° C., and up to about 60° C., preferably about 25° C. to about 40° C., to decrease the viscosity of the concentrated protein solution to facilitate performance of the subsequent dilution step and micelle formation. The concentrated protein solution should not be heated beyond a temperature above which micelle formation does not occur on dilution by chilled water.

The concentrated protein solution resulting from the concentration step, optional diafiltration step, optional ionic strength adjustment step, optional defatting step, optional adsorbent treatment step and optional pasteurization step, then is diluted to effect micelle formation by mixing the concentrated protein solution with chilled water having the volume required to achieve the degree of dilution desired. Depending on the proportion of soy protein desired to be obtained by the micelle route and the proportion from the supernatant, the degree of dilution of the concentrated protein solution may be varied. With lower dilution levels, in general, a greater proportion of the soy protein remains in the aqueous phase.

When it is desired to provide the greatest proportion of the protein by the micelle route, the concentrated protein solution is diluted by about 5 fold to about 25 fold, preferably by about 10 fold to about 20 fold.

The chilled water with which the concentrated protein solution is mixed has a temperature of less than about 15° C., generally about 1° to about 15° C., preferably less than about 10° C., since improved yields of protein isolate in the form of protein micellar mass are attained with these colder temperatures at the dilution factors used.

In a batch operation, the batch of concentrated protein solution is added to a static body of chilled water having the desired volume, as discussed above. The dilution of the concentrated protein solution and consequential decrease in ionic strength causes the formation of a cloud-like mass of highly associated protein molecules in the form of discrete protein droplets in micellar form. In the batch procedure, the protein micelles are allowed to settle in the body of chilled water to form an aggregated, coalesced, dense, amorphous sticky gluten-like protein micellar mass (PMM). The settling may be assisted, such as by centrifugation. Such induced settling decreases the liquid content of the protein micellar mass, thereby decreasing the moisture content generally from about 70% by weight to about 95% by weight to a value of generally about 50% by weight to about 80% by weight of the total micellar mass. Decreasing the moisture content of the micellar mass in this way also decreases the occluded salt content of the micellar mass, and hence the salt content of the dried protein product.

Alternatively, the dilution operation may be carried out continuously by continuously passing the concentrated protein solution to one inlet of a T-shaped pipe, while the diluting water is fed to the other inlet of the T-shaped pipe, permitting mixing in the pipe. The diluting water is fed into the T-shaped pipe at a rate sufficient to achieve the desired degree of dilution of the concentrated protein solution.

The mixing of the concentrated protein solution and the diluting water in the pipe initiates the formation of protein micelles and the mixture is continuously fed from the outlet of the T-shaped pipe into a settling vessel, from which, when full, supernatant is permitted to overflow. The mixture preferably is fed into the body of liquid in the settling vessel in a manner which minimizes turbulence within the body of liquid.

In the continuous procedure, the protein micelles are allowed to settle in the settling vessel to form an aggregated, coalesced, dense, amorphous, sticky, gluten-like protein micellar mass (PMM) and the procedure is continued until a desired quantity of the PMM has accumulated in the bottom of the settling vessel, whereupon the accumulated PMM is removed from the settling vessel. In lieu of settling by sedimentation, the PMM may be separated continuously by centrifugation.

By the utilization of a continuous process for the recovery of soy protein micellar mass as compared to the batch process, the initial protein extraction step can be significantly reduced in time for the same level of protein extraction and significantly higher temperatures can be employed in the extraction step. In addition, in a continuous operation, there is less chance of contamination than in a batch procedure, leading to higher product quality and the process can be carried out in more compact equipment.

The settled micellar mass is separated from the residual aqueous phase or supernatant, such as by decantation of the residual aqueous phase from the settled mass or by centrifugation. The PMM may be used in the wet form or may be dried, by any convenient technique, such as spray drying or freeze drying, to a dry form. The dry PMM has a high protein content, in excess of about 90 wt % protein, preferably at least about 100 wt % protein (calculated as N×6.25) d.b., and is substantially undenatured. Alternatively, the wet PMM may be adjusted in pH to a pH of about 2.0 to about 4.0, preferably about 2.9 to about 3.2. The pH adjustment may be effected in any convenient manner, such as by addition of hydrochloric acid or phosphoric acid. The resulting acidified soy protein solution then is dried. As a further alternative, the pH adjusted soy protein solution may be subjected to a heat treatment to inactivate heat labile anti-nutritional factors, such as the trypsin inhibitors mentioned above. Such a heating step also provides the additional benefit of reducing the microbial load. Generally, the protein solution is heated to a temperature of about 70° to about 100° C., preferably about 85° to about 95° C., for about 10 seconds to about 60 minutes, preferably about 30 seconds to about 5 minutes. The heat treated acidified soy protein solution then may be cooled to a temperature of about 2° C. to about 60° C., preferably about 20° to about 35° C. The resulting acidified, heat treated soy protein solution then is dried.

In one aspect of the present invention, a calcium salt or other divalent salt, preferably calcium chloride is added to the supernatant, which may first be concentrated or partially concentrated in the manner described below, to provide a conductivity of about 2 mS to about 30 mS, preferably 8 mS to about 15 mS. The calcium chloride added to the supernatant may be in any desired form, such as a concentrated aqueous solution thereof.

The addition of the calcium chloride has the effect of depositing phytic acid from the supernatant in the form of calcium phytate. The deposited phytate is recovered from the supernatant, such as by centrifugation and/or filtration to leave a clear solution.

The pH of the clear solution then may be adjusted to a value of about 1.5 to about 4.4, preferably about 2.0 to about 4.0. The pH adjustment may be effected in any convenient manner, such as by the addition of hydrochloric acid or phosphoric acid. If desired, the acidification step may be omitted from the various options described herein (other than the heat treatment mentioned below), once the precipitated phytate material has been removed.

The pH adjusted clear acidified aqueous soy protein solution may be subjected to a heat treatment to inactivate heat labile anti-nutritional factors, such as the trypsin inhibitors mentioned above. Such a heating step also provides the additional benefit of reducing the microbial load. Generally, the protein solution is heated to a temperature of about 70° to about 100° C., preferably about 85° to about 95° C., for about 10 seconds to about 60 minutes, preferably about 30 seconds to about 5 minutes. The heat treated acidified soy protein solution then may be cooled for further processing as described below, to a temperature of about 2° C. to about 60° C., preferably about 20° to about 35° C.

The optionally pH-adjusted and optionally heat treated clear solution, if not already concentrated, is concentrated to increase the protein concentration thereof. Such concentration is effected using any convenient selective membrane technique, such as ultrafiltration or diafiltration, using membranes with a suitable molecular weight cut-off permitting low molecular weight species, including salt, carbohydrates, pigments, trypsin inhibitors and other low molecular weight materials extracted from the protein source material, to pass through the membrane, while retaining a significant proportion of the soy protein in the solution. Ultrafiltration membranes having a molecular weight cut-off of about 3,000 to 1,000,000 Daltons, preferably about 5,000 to about 100,000

Daltons, having regard to differing membrane materials and configuration, may be used. Concentration of the protein solution in this way also reduces the volume of liquid required to be dried to recover the protein. The protein solution generally is concentrated to a protein concentration of about 50 g/L to about 400 g/L, preferably about 100 to about 250 g/L, prior to drying. Such concentration operation may be carried out in a batch mode or in a continuous operation, as described above.

Where the supernatant is partially concentrated prior to the addition of the calcium salt and fully concentrated after removal of the precipitate, the supernatant is first concentrated to a protein concentration of about 50 g/L or less, and, after removal of the precipitate, then is concentrated to a protein concentration of about 50 to about 400 g/L, preferably about 100 to about 250 g/L.

The protein solution may be subjected to a diafiltration step, before or after partial or complete concentration, preferably using water or a dilute saline solution. The diafiltration solution may be at its natural pH, a pH equal to that of the protein solution being diafiltered or any pH in between. Such diafiltration may be effected using from about 2 to about 40 volumes of diafiltration solution, preferably about 5 to about 25 volumes of diafiltration solution. In the diafiltration operation, further quantities of contaminants are removed from the aqueous solution by passage through the membrane with the permeate. The diafiltration operation may be effected until no significant further quantities of contaminants or visible colour are present in the permeate or until the protein solution has been sufficiently purified. Such diafiltration may be effected using the same membrane as for the concentration step. However, if desired, the diafiltration may be effected using a separate membrane, such as a membrane having a molecular weight cut-off in the range of about 3,000 to about 1,000,000 daltons, preferably about 5,000 to about 100,000 daltons, having regard to different membrane materials and configuration.

The concentration step and the diafiltration step may be effected herein in such a manner that the soy protein product subsequently recovered by drying the concentrated and diafiltered retentate contains less than about 90 wt % protein (N×6.25) d.b., such as at least about 60 wt % protein (N×6.25) d.b. By partially concentrating and/or partially diafiltering the aqueous soy protein solution, it is possible to only partially remove contaminants. This protein solution may then be dried to provide a soy protein product with lower levels of purity. The soy protein product is still able to produce clear protein solutions under acidic conditions.

An antioxidant may be present in the diafiltration medium during at least part of the diafiltration step. The antioxidant may be any convenient antioxidant, such as sodium sulfite or ascorbic acid. The quantity of antioxidant employed in the diafiltration medium depends on the materials employed and may vary from about 0.01 to about 1 wt %, preferably about 0.05 wt %. The antioxidant serves to inhibit the oxidation of any phenolics present in the concentrated soy protein isolate solution.

The concentration step and the diafiltration step may be effected at any convenient temperature, generally about 2° to about 60° C., preferably about 20° to about 35° C., and for the period of time to effect the desired degree of concentration and diafiltration. The temperature and other conditions used to some degree depend upon the membrane equipment used to effect the membrane processing, the desired protein concentration of the solution and the efficiency of the removal of contaminants to the permeate.

As mentioned above, the level of trypsin inhibitor activity in the final soy protein product can be controlled by manipulation of various process variables.

As previously noted, heat treatment of the acidified aqueous soy protein solution may be used to inactivate heat-labile trypsin inhibitors. The partially concentrated or fully concentrated acidified soy protein solution may also be heat treated to inactivate heat labile trypsin inhibitors.

In addition, the concentration and/or diafiltration steps may be operated in a manner favorable for removal of trypsin inhibitors in the permeate along with the other contaminants. Removal of the trypsin inhibitors is promoted by using a membrane of larger pore size, such as about 30,000 to 1,000,000 Da, operating the membrane at elevated temperatures, such as about 30 to about 60° C. and employing greater volumes of diafiltration medium, such as about 20 to about 40 volumes.

Acidifying and membrane processing the diluted protein solution at a lower pH, such as about 1.5 to about 3 may reduce the trypsin inhibitor activity relative to processing the solution at a higher pH, such as about 3 to about 4.4. When the protein solution is concentrated and diafiltered at the low end of the pH range, it may be desired to raise the pH of the retentate prior to drying. The pH of the concentrated and diafiltered protein solution may be raised to the desired value, for example pH 3, by the addition of any convenient food grade alkali such as sodium hydroxide.

Further, a reduction in trypsin inhibitor activity may be achieved by exposing soy materials to reducing agents that disrupt or rearrange the disulfide bonds of the inhibitors. Suitable reducing agents include sodium sulfite, cysteine and N-acetylcysteine.

The addition of such reducing agents may be effected at various stages of the overall process. The reducing agent may be added with the soy protein source material in the extraction step, may be added to the clarified aqueous soy protein solution following removal of residual soy protein source material, may be added to the diafiltered retentate before dilution, may be added to the supernatant, may be added to the concentrated and diafiltered calcium modified supernatant before drying or may be dry blended with the dried soy protein product. The addition of the reducing agent may be combined with a heat treatment step and the membrane processing steps, as described above.

If it is desired to retain active trypsin inhibitors in the concentrated protein solution, this can be achieved by eliminating or reducing the intensity of the heat treatment step, not utilizing reducing agents, operating the concentration and diafiltration steps at the higher end of the pH range, such as about 3 to about 4.4, utilizing a concentration and diafiltration membrane with a smaller pore size, operating the membrane at lower temperatures and employing fewer volumes of diafiltration medium.

The concentrated and diafiltered aqueous protein solution may be treated with an adsorbent, such as powdered activated carbon or granulated activated carbon, to remove colour and/or odour compounds. Such adsorbent treatment may be carried out under any convenient conditions, generally at the ambient temperature of the concentrated protein solution. For powdered activated carbon, an amount of about 0.025% to about 5% w/v, preferably about 0.05% to about 2% w/v, is employed. The adsorbent may be removed from the soy protein solution by any convenient means, such as by filtration.

The pH of the concentrated and optionally diafiltered and optionally adsorbent treated protein solution may be adjusted to about 2.0 to about 4.0, if a pH adjustment step has not already been employed. The pH adjusted, concentrated and optionally diafiltered and optionally adsorbent treated protein solution may also be heat treated to reduce the level of trypsin inhibitor activity as described above.

The concentrated and optionally diafiltered and optionally adsorbent treated protein solution is dried by any convenient technique, such as spray drying or freeze drying, to a dry form. The dried soy protein product has a protein content of at least about 60 wt % (N×6.25) d.b., preferably in excess of about 90 wt % (N×6.25) d.b., more preferably at least about 100 wt %. The soy protein product is low in phytic acid content, generally less than about 1.5% by weight.

In one embodiment of the present invention, the supernatant from the formation of PMM may be processed directly to form a soy protein product utilizing the steps described above while omitting the addition of calcium chloride. The soy protein product so formed has a protein content of at least about 60 wt % (N×6.25) d.b., preferably in excess of about 90 wt % (N×6.25) d.b., more preferably at least about 100 wt %.

The soy protein products produced herein are soluble in an acidic aqueous environment, making the products ideal for incorporation into beverages, both carbonated and uncarbonated, to provide protein fortification thereto. Such beverages have a wide range of acidic pH values, ranging from about 2.5 to about 5. The soy protein products provided herein may be added to such beverages in any convenient quantity to provide protein fortification to such beverages, for example, to provide at least about 5 g of soy protein per serving. The added soy protein product dissolves in the beverage and does not impair the clarity of the beverage, even after thermal processing. The soy protein product may be blended with dried beverage prior to reconstitution of the beverage by dissolution in water. In some case, modification of the normal formulation of the beverage to tolerate the composition of the invention may be necessary where components present in the beverage may adversely affect the ability of the composition to remain dissolved in the beverage.

EXAMPLES

Example 1

This Example illustrates the production of protein micellar mass (S300), supernatant derived protein isolate (S200) and calcium modified supernatant derived protein isolate (S200Ca) from soy.

'a' kg of defatted, minimally heat processed soy flour was added to 'b' L of 'c' M NaCl solution at ambient temperature and agitated for 60 minutes to provide an aqueous protein solution. The residual soy flour was removed and the resulting protein solution was clarified by centrifugation and filtration to produce 'd' L of filtered protein solution having a protein content of 'e'% by weight.

The protein extract solution was reduced to 'f' kg by concentration on a 'g' membrane having a molecular weight cutoff of 'h' Daltons producing a concentrated protein solution with a protein content of 'i'% by weight.

The conductivity of the concentrated protein solution was T mS. Concentrated sodium chloride solution was added to the retentate to raise the conductivity to 'k' mS. The concentrated protein solution at 'l'° C. was then diluted 'm' into cold RO water having a temperature 'n'° C. A white cloud formed immediately. The supernatant was removed and the precipitated, viscous, sticky mass (PMM) was recovered by centrifugation in a yield of 'o' wt % of the filtered protein solution. The dried PMM derived protein was found to have a protein content of 'p'% (N×6.25) d.b. The product was given a designation 'q' 300.

The parameters 'a' to 'q' are set forth in the following Table 1:

TABLE 1

Parameters for the production of S300

| q | S005-J27-08A | S005-K19-08A |
|---|---|---|
| a | 10 | 10 |
| b | 200 | 200 |
| c | 0.15 | 0.50 |
| d | 185 | 165 |
| e | 0.70 | 1.34 |
| f | 5.28 | 12.06 |
| g | PES | PES |
| h | 100,000 | 100,000 |
| i | 21.28 | 17.51 |
| j | 9.45 | 24.9 |
| k | 21.4 | 24.9 |
| l | 27.8 | 30 |
| m | 1:10 | 1:5 |
| n | 1.6 | 4 |
| o | 18.5 | 20.8 |
| p | 91.31 | 99.66 |

The supernatants from these two runs were processed in different ways. The supernatant from the S005-J27-08A run was processed without calcium modification. In this run, 65 L of supernatant was concentrated to a volume of 5 L on a PES membrane with a molecular weight cutoff of 10,000 Daltons then diafiltered with 25 L of reverse osmosis purified water on the same membrane. The diafiltered retentate had a protein concentration of 12.60 wt %. With the additional protein recovered from the supernatant, the overall recovery of the filtered protein solution was 69.2%. The diafiltered retentate was dried to form a product with a protein content of 98.76% (N×6.25) d.b. The product was given the designation S005-J27-08A S200.

The supernatant from run S005-K19-08A was processed with calcium modification. To 65 L of supernatant was added 0.336 kg of $CaCl_2$, which raised the conductivity of the solution from 6.31 mS to 12.65 mS. The precipitate that formed was removed by centrifugation and then the pH of the centrate adjusted to 3 with diluted HCl. The acidified centrate was then concentrated from a volume of 66 L to a volume of 5 L on a PES membrane with a molecular weight cut-off of 10,000 Daltons. The concentrate was then diafiltered on the same membrane with 25 L of reverse osmosis purified water adjusted to pH 3 with diluted HCl. With the additional protein recovered from the supernatant, the overall recovery of the filtered protein solution was 37.1%. The diafiltered retentate was dried to produce a product with a protein content of 98.01% (N×6.25) d.b. The product was given the designation S005-K19-08A S200Ca.

The colour of the dry powdered products was assessed with a HunterLab ColorQuest XE instrument in reflectance mode. The colour values are set forth in the following Table 2:

TABLE 2

HunterLab scores for dry products

| sample | L* | a* | b* |
|---|---|---|---|
| S005-J27-08A S300 | 87.06 | −0.28 | 10.04 |
| S005-K19-08A S300 | 85.98 | 0.72 | 10.91 |
| S005-J27-08A S200 | 84.51 | 0.56 | 10.51 |
| S005-K19-08A S200Ca | 86.87 | 0.58 | 9.53 |

As may be seen from Table 2, the dry colour of all the products was quite light.

Example 2

This Example contains an evaluation of the heat stability in water of the soy protein isolates produced by the method of Example 1 (S300, S200, S200Ca).

A 2% w/v protein solution of each product in water was produced and the pH adjusted to 3. The clarity of these solutions was assessed by haze measurement with the HunterLab ColorQuest XE instrument in transmission mode. The solutions were then heated to 95° C., held at this temperature for 30 seconds and then immediately cooled to room temperature in an ice bath. The clarity of the heat treated solutions was then measured again.

The clarity of the protein solutions before and after heating is set forth in the following Table 3:

TABLE 3

Effect of heat treatment on clarity of various samples

| sample | Haze (%) before heating | Haze (%) after heating |
|---|---|---|
| S005-J27-08A S300 | 24.9 | 21.1 |
| S005-K19-08A S300 | 30.5 | 29.6 |
| S005-J27-08A S200 | 11.0 | 3.2 |
| S005-K19-08A S200Ca | 7.3 | 7.9 |

As can be seen in Table 3, the S200 and S200Ca samples gave quite clear solutions in water at pH 3. The solutions of the S300 samples were not as clear. All of the samples were heat stable, with the haze level essentially staying constant upon heating, or actually improving.

Example 3

This Example contains an evaluation of the solubility in water of the soy protein isolates produced by the method of Example 1 (S300, S200, S200Ca). Solubility was tested based on protein solubility (termed protein method, a modified version of the procedure of Mon et al., J. Food Sci. 50:1715-1718) and total product solubility (termed pellet method).

Sufficient protein powder to supply 0.5 g of protein was weighed into a beaker and then a small amount of reverse osmosis (RO) purified water was added and the mixture stirred until a smooth paste formed. Additional water was then added to bring the volume to approximately 45 ml. The contents of the beaker were then slowly stirred for 60 minutes using a magnetic stirrer. The pH was determined immediately after dispersing the protein and was adjusted to the appropriate level (2, 3, 4, 5, 6 or 7) with diluted NaOH or HCl. A sample was also prepared at natural pH. For the pH adjusted samples, the pH was measured and corrected two times during the 60 minutes stirring. After the 60 minutes of stirring, the samples were made up to 50 ml total volume with RO water, yielding a 1% w/v protein dispersion. The protein content of the dispersions was measured using a LECO FP528 Nitrogen Determinator. Aliquots (20 ml) of the dispersions were then transferred to pre-weighed centrifuge tubes that had been dried overnight in a 100° C. oven then cooled in a desiccator and the tubes capped. The samples were centrifuged at 7800 g for 10 minutes, which sedimented insoluble material and yielded a clear supernatant. The protein content of the supernatant was measured by LECO analysis and then the supernatant and the tube lids were discarded and the pellet material dried overnight in an oven set at 100° C. The next morning the tubes were transferred to a desiccator and allowed to cool. The weight of dry pellet material was recorded. The dry weight of the initial protein powder was calculated by multiplying the weight of powder used by a factor of ((100−moisture content of the powder (%))/100). Solubility of the product was then calculated two different ways:

Solubility(protein method)(%)=(% protein in supernatant/% protein in initial dispersion)×100         1)

Solubility(pellet method)(%)=(1−(weight dry insoluble pellet material/((weight of 20 ml of dispersion/weight of 50 ml of dispersion)×initial weight dry protein powder)))×100         2)

The natural pH values of the protein isolates produced in Example 1 in water (1% protein) are shown in Table 4:

TABLE 4

Natural pH of protein solution prepared in water at 1% protein

| Batch | Product | Natural pH |
|---|---|---|
| S005-J27-08A | S300 | 6.67 |
| S005-K19-08A | S300 | 6.76 |
| S005-J27-08A | S200 | 6.70 |
| S005-K19-08A | S200Ca | 3.29 |

The solubility results obtained are set forth in the following Tables 5 and 6:

TABLE 5

Solubility of products at different pH values based on protein method

| | | Solubility (Protein method) (%) | | | | | | |
|---|---|---|---|---|---|---|---|---|
| Batch | Product | pH 2 | pH 3 | pH 4 | pH 5 | pH 6 | pH 7 | Nat. pH |
| S005-J27-08A | S300 | 100 | 94.2 | 43.4 | 19.1 | 91.9 | 99.1 | 95.0 |
| S005-K19-08A | S300 | 100 | 100 | 85.3 | 8.1 | 23.7 | 100 | 94.7 |
| S005-J27-08A | S200 | 91.5 | 100 | 98.8 | 0.0 | 76.7 | 94.4 | 89.5 |
| S005-K19-08A | S200Ca | 94.7 | 100 | 100 | 20 | 38 | 66.3 | 100 |

TABLE 6

Solubility of products at different pH values based on pellet method

| | | Solubility (pellet method) (%) | | | | | | |
|---|---|---|---|---|---|---|---|---|
| Batch | Product | pH 2 | pH 3 | pH 4 | pH 5 | pH 6 | pH 7 | Nat. pH |
| S005-J27-08A | S300 | 97.1 | 97.0 | 55.4 | 29.3 | 91.7 | 94.5 | 86.9 |
| S005-K19-08A | S300 | 96.5 | 96.1 | 76.3 | 5.7 | 29.1 | 93.1 | 86.8 |
| S005-J27-08A | S200 | 96.9 | 97.8 | 96.3 | 15.1 | 86.1 | 97.9 | 98.1 |
| S005-K19-08A | S200Ca | 98.2 | 95.8 | 97.2 | 31.4 | 55.0 | 71.1 | 98.3 |

As can be seen from the results of Tables 5 and 6, the S300 products were very soluble at pH values 2, 3 and 7. The S200 was very soluble at pH 2 to 4 and 7. The S200Ca was very soluble in the range of pH 2 to 4.

Example 4

This Example contains an evaluation of the clarity in water of the soy protein isolates produced by the method of Example 1 (S300, S200, S200Ca).

The clarity of the 1% w/v protein solutions prepared as described in Example 3 was assessed by measuring the absorbance at 600 nm, with a lower absorbance score indicating greater clarity. Analysis of the samples on a HunterLab ColorQuest XE instrument in transmission mode also provided a percentage haze reading, another measure of clarity.

The clarity results are set forth in the following Tables 7 and 8:

TABLE 7

Clarity of protein solutions at different pH values as assessed by A600

| | | A600 | | | | | | |
|---|---|---|---|---|---|---|---|---|
| Batch | Product | pH 2 | pH 3 | pH 4 | pH 5 | pH 6 | pH 7 | Nat. pH |
| S005-J27-08A | S300 | 0.025 | 0.064 | >3.0 | >3.0 | 1.568 | 0.819 | 2.482 |
| S005-K19-08A | S300 | 0.059 | 0.117 | 1.995 | >3.0 | >3.0 | 0.319 | 0.468 |
| S005-J27-08A | S200 | 0.053 | 0.066 | 0.127 | >3.0 | 1.064 | 0.070 | 0.080 |
| S005-K19-08A | S200Ca | 0.031 | 0.040 | 0.066 | >3.0 | >3.0 | 1.922 | 0.047 |

TABLE 8

Clarity of protein solutions at different pH values as assessed by HunterLab analysis

| | | HunterLab haze reading (%) | | | | | | |
|---|---|---|---|---|---|---|---|---|
| Batch | Product | pH 2 | pH 3 | pH 4 | pH 5 | pH 6 | pH 7 | Nat. pH |
| S005-J27-08A | S300 | 8.1 | 16.3 | 98.9 | 99.9 | 97.6 | 89.5 | 98.8 |
| S005-K19-08A | S300 | 5.8 | 16.9 | 92.4 | 93.4 | 93.4 | 40.2 | 54.1 |
| S005-J27-08A | S200 | 5.6 | 6.4 | 14.4 | 97.4 | 86.5 | 8.1 | 9.2 |
| S005-K19-08A | S200Ca | 1.2 | 3.3 | 7.1 | 93.6 | 92.9 | 92.4 | 2.9 |

As can be seen from the results of Tables 7 and 8, solutions of S300 were clear at pH 2 and slightly hazy at pH 3. Solutions of this product at the higher pH values were quite hazy. Solutions of S200 and S200Ca were clear in the pH range 2 to 4 and the S200 solution was also clear at natural pH and pH 7.

Example 5

This Example contains an evaluation of the solubility in a soft drink (Sprite) and sports drink (Orange Gatorade) of the soy protein isolates produced by the method of Example 1 (S300, S200, S200Ca). The solubility was determined with the protein added to the beverages with no pH correction and again with the pH of the protein fortified beverages adjusted to the level of the original beverages.

When the solubility was assessed with no pH correction, a sufficient amount of protein powder to supply 1 g of protein was weighed into a beaker and a small amount of beverage was added and stirred until a smooth paste formed. Additional beverage was added to bring the volume to 50 ml, and then the solutions were stirred slowly on a magnetic stirrer for 60 minutes to yield a 2% protein w/v dispersion. The protein content of the samples was analyzed using a LECO FP528 Nitrogen Determinator then an aliquot of the protein containing beverages was centrifuged at 7800 g for 10 minutes and the protein content of the supernatant measured.

Solubility(%)=(% protein in supernatant/% protein in initial dispersion)×100

When the solubility was assessed with pH correction, the pH of the soft drink (Sprite) (3.39) and sports drink (Orange Gatorade) (3.19) without protein was measured. A sufficient amount of protein powder to supply 1 g of protein was weighed into a beaker and a small amount of beverage was added and stirred until a smooth paste formed. Additional beverage was added to bring the volume to approximately 45 ml, and then the solutions were stirred slowly on a magnetic stirrer for 60 minutes. The pH of the protein containing beverages was measured and then adjusted to the original no-protein pH with HCl or NaOH as necessary. The total volume of each solution was then brought to 50 ml with additional beverage, yielding a 2% protein w/v dispersion. The protein content of the samples was analyzed using a LECO FP528 Nitrogen Determinator then an aliquot of the protein containing beverages was centrifuged at 7800 g for 10 minutes and the protein content of the supernatant measured.

Solubility(%)=(% protein in supernatant/% protein in initial dispersion)×100

The results obtained are set forth in the following Table 9:

TABLE 9

Solubility of products in Sprite and Orange Gatorade

| | | no pH correction | | pH correction | |
|---|---|---|---|---|---|
| Batch | Product | Solubility (%) in Sprite | Solubility (%) in Orange Gatorade | Solubility (%) in Sprite | Solubility (%) in Orange Gatorade |
| S005-J27-08A | S300 | 25.6 | 42.2 | 87.9 | 90.3 |
| S005-K19-08A | S300 | 4.8 | 71.0 | 95.3 | 85.2 |
| S005-J27-08A | S200 | 17.3 | 69.9 | 66.5 | 74.4 |
| S005-K19-08A | S200Ca | 95.7 | 100 | 94.1 | 100 |

As can be seen from the results of Table 9, the S200Ca was the product with the best solubility in the Sprite and Orange Gatorade. This is an acidified product and so had little effect on the beverage pH. The remaining products were not acidified and so their solubility was improved by pH correction of the beverages. After pH correction, the solubility of the S300 products was quite good but the solubility of the S200 was surprisingly low, given the solubility results obtained in water in Example 3.

Example 6

This Example contains an evaluation of the clarity in a soft drink and sports drink of the soy protein isolates produced by the method of Example 1 (S300, S200, S200Ca).

The clarity of the 2% w/v protein dispersions prepared in soft drink (Sprite) and sports drink (Orange Gatorade) in Example 5 were assessed using the methods described in Example 4. For the absorbance measurements at 600 nm, the spectrophotometer was blanked with the appropriate beverage before the measurement was performed.

The results obtained are set forth in the following Tables 10 and 11:

TABLE 10

Clarity (A600) of products in Sprite and Orange Gatorade

| | | no pH correction | | pH correction | |
|---|---|---|---|---|---|
| Batch | Product | A600 in Sprite | A600 in Orange Gatorade | A600 in Sprite | A600 in Orange Gatorade |
| S005-J27-08A | S300 | >3.0 | >3.0 | 1.730 | 1.740 |
| S005-K19-08A | S300 | >3.0 | >3.0 | 1.339 | 1.028 |
| S005-J27-08A | S200 | >3.0 | 2.816 | 1.560 | 1.560 |
| S005-K19-08A | S200Ca | 0.084 | 0.019 | 0.093 | 0.071 |

TABLE 11

HunterLab haze readings for products in Sprite and Orange Gatorade

| | | no pH correction | | pH correction haze | |
|---|---|---|---|---|---|
| Batch | Product | haze (%) in Sprite | haze (%) in Orange Gatorade | haze (%) in Sprite | (%) in Orange Gatorade |
| no protein | | 0.0 | 44.0 | 0.0 | 44.0 |
| S005-J27-08A | S300 | 97.7 | 98.1 | 89.3 | 89.9 |
| S005-K19-08A | S300 | 93.6 | 93.5 | 94.9 | 86.3 |
| S005-J27-08A | S200 | 97.4 | 98.2 | 88.6 | 90.4 |
| S005-K19-08A | S200Ca | 12.3 | 46.7 | 19.5 | 53.3 |

As can be seen from the results of Tables 10 and 11, the S200Ca product had the least impact on clarity in Sprite and Orange Gatorade. However, the S200Ca in Sprite was slightly hazy, particularly when tested with pH correction. The Sprite and Orange Gatorade samples containing S300 and S200 were very hazy regardless of whether pH correction was employed.

Example 7

This Example illustrates the production of a soy protein isolate derived from concentrated retentate (S500) from a sodium chloride extraction.

12.5 kg of defatted, minimally heat processed soy flour was added to 125 L of 0.15 M NaCl solution at ambient temperature and agitated for 30 minutes to provide an aqueous protein solution. The residual soy flour was removed and the resulting protein solution was clarified by centrifugation and filtration to produce 97 L of filtered protein solution having a protein content of 1.14% by weight.

The protein extract solution was reduced in volume to 7 L by concentration on a PVDF membrane having a molecular weight cutoff of 5,000 daltons, producing a concentrated protein solution with a protein content of 14.83% by weight.

The concentrated protein solution was then diafiltered using 14 L of 0.075 M NaCl solution. The diafiltered retentate had a final weight of 6.14 kg and a protein content of 14.16% by weight in a yield of 78.4 wt % of the filtered protein solution. The diafiltered retentate was dried to form a product with a protein content of 95.45% (N×6.25) d.b. The product was given the designation S005-L17-08A S500.

A 3.2% w/v protein solution of S500 was prepared in water and the pH lowered to 3 with diluted HCl. The colour and clarity was then assessed using a HunterLab ColorQuest XE instrument operated in transmission mode.

The colour and clarity values are set forth in the following Table 12:

TABLE 12

HunterLab scores for 3.2% protein solution of S005-L17-08A S500 at pH 3

| sample | L* | a* | b* | haze (%) |
|---|---|---|---|---|
| S500 | 94.86 | −1.15 | 15.45 | 22.0 |

As may be seen from Table 12, the colour of the S500 solution at pH 3 was quite light but the solution was also hazy.

The colour of the dry powder was also assessed with the HunterLab ColorQuest XE instrument in reflectance mode. The colour values are set forth in the following Table 13:

TABLE 13

HunterLab scores for dry S005-L17-08A S500

| sample | L* | a* | b* |
|---|---|---|---|
| S500 | 84.71 | 0.14 | 14.88 |

As may be seen from Table 13, the dry colour of the product was quite light.

Example 8

This Example contains an evaluation of the heat stability in water of the soy protein isolate produced by the method of Example 7 (S500).

A 2% w/v protein solution of the product in water was produced and the pH adjusted to 3. The clarity of this solution was assessed by haze measurement with a HunterLab ColorQuest XE instrument in transmission mode. The solution was then heated to 95° C., held at this temperature for 30 seconds and then immediately cooled to room temperature in an ice bath. The clarity of the heat treated solution was then measured again.

The clarity of the protein solution before and after heating is set forth in the following Table 14:

TABLE 14

Effect of heat treatment on clarity of S005-L17-08A S500 solution

| sample | Haze (%) before heating | Haze (%) after heating |
|---|---|---|
| S500 | 7.9 | 9.8 |

As can be seen in Table 14, the S500 sample gave quite a clear solution in water at pH 3. The sample was heat stable, with the haze level only slightly changed upon heating.

Example 9

This Example contains an evaluation of the solubility in water of the soy protein isolate produced by the method of Example 7 (S500). Solubility was tested based on protein solubility (termed protein method, a modified version of the procedure of Mon et al., J. Food Sci. 50:1715-1718) and total product solubility (termed pellet method).

Sufficient protein powder to supply 0.5 g of protein was weighed into a beaker and then a small amount of reverse osmosis (RO) purified water was added and the mixture stirred until a smooth paste formed. Additional water was then added to bring the volume to approximately 45 ml. The contents of the beaker were then slowly stirred for 60 minutes using a magnetic stirrer. The pH was determined immediately after dispersing the protein and was adjusted to the appropriate level (2, 3, 4, 5, 6 or 7) with diluted NaOH or HCl. A sample was also prepared at natural pH. For the pH adjusted samples, the pH was measured and corrected two times during the 60 minutes stirring. After the 60 minutes of stirring, the samples were made up to 50 ml total volume with RO water, yielding a 1% w/v protein dispersion. The protein content of the dispersions was measured using a LECO FP528 Nitrogen Determinator. Aliquots (20 ml) of the dispersions were then transferred to pre-weighed centrifuge tubes that had been dried overnight in a 100° C. oven then cooled in a desiccator and the tubes capped. The samples were centrifuged at 7800 g for 10 minutes, which sedimented insoluble material and yielded a clear supernatant. The protein content of the supernatant was measured by LECO analysis and then the supernatant and the tube lids were discarded and the pellet material dried overnight in an oven set at 100° C. The next morning the tubes were transferred to a desiccator and allowed to cool. The weight of dry pellet material was recorded. The dry weight of the initial protein powder was calculated by multiplying the weight of powder used by a factor of ((100−moisture content of the powder(%))/100). Solubility of the product was then calculated two different ways:

Solubility(protein method)(%)=(% protein in supernatant/% protein in initial dispersion)×100    1)

Solubility(pellet method)(%)=(1−(weight dry insoluble pellet material/((weight of 20 ml of dispersion/weight of 50 ml of dispersion)×initial weight dry protein powder)))×100    2)

The natural pH value of the protein isolate produced in Example 7 in water (1% protein) is shown in Table 15:

TABLE 15

Natural pH of S500 solution prepared in water at 1% protein

| Batch | Product | Natural pH |
|---|---|---|
| S005-L17-08A | S500 | 6.61 |

The solubility results obtained are set forth in the following Tables 16 and 17:

TABLE 16

Solubility of S500 at different pH values based on protein method

| | | Solubility (protein method) (%) | | | | | | |
|---|---|---|---|---|---|---|---|---|
| Batch | Product | pH 2 | pH 3 | pH 4 | pH 5 | pH 6 | pH 7 | Nat. pH |
| S005-L17-08A | S500 | 92.6 | 100 | 60.4 | 26.9 | 88.3 | 100 | 92.6 |

TABLE 17

Solubility of S500 at different pH values based on pellet method

| | | Solubility (pellet method) (%) | | | | | | |
|---|---|---|---|---|---|---|---|---|
| Batch | Product | pH 2 | pH 3 | pH 4 | pH 5 | pH 6 | pH 7 | Nat. pH |
| S005-L17-08A | S500 | 97.8 | 97.5 | 68.3 | 30.3 | 84.9 | 97.4 | 97.6 |

As can be seen from the results of Tables 16 and 17, the S500 product was very soluble at pH 2, 3 and 7 and at the natural pH.

Example 10

This Example contains an evaluation of the clarity in water of the soy protein isolate produced by the method of Example 7 (S500).

The clarity of the 1% w/v protein solution prepared as described in Example 9 was assessed by measuring the absorbance at 600 nm, with a lower absorbance score indicating greater clarity. Analysis of the samples on a HunterLab ColorQuest XE instrument in transmission mode also provided a percentage haze reading, another measure of clarity.

The clarity results are set forth in the following Tables 18 and 19:

TABLE 18

Clarity of S500 solution at different pH values as assessed by A600

| | | A600 | | | | | | |
|---|---|---|---|---|---|---|---|---|
| Batch | Product | pH 2 | pH 3 | pH 4 | pH 5 | pH 6 | pH 7 | Nat. pH |
| S005-L17-08A | S500 | 0.020 | 0.044 | >3.0 | >3.0 | 1.499 | 0.048 | 0.061 |

TABLE 19

Clarity of S500 solution at different pH values as assessed by HunterLab analysis

| | | HunterLab haze reading (%) | | | | | | |
|---|---|---|---|---|---|---|---|---|
| Batch | Product | pH 2 | pH 3 | pH 4 | pH 5 | pH 6 | pH 7 | Nat. pH |
| S005-L17-08A | S500 | 0.6 | 6.5 | 95.3 | 95.9 | 90.8 | 7.0 | 5.5 |

As can be seen from the results of Tables 18 and 19, solutions of S500 had excellent clarity at pH 2, 3 and 7 and at natural pH.

Example 11

This Example contains an evaluation of the solubility in a soft drink (Sprite) and sports drink (Orange Gatorade) of the soy protein isolate produced by the method of Example 7 (S500). The solubility was determined with the protein added to the beverages with no pH correction and again with the pH of the protein fortified beverages adjusted to the level of the original beverages.

When the solubility was assessed with no pH correction, a sufficient amount of protein powder to supply 1 g of protein was weighed into a beaker and a small amount of beverage was added and stirred until a smooth paste formed. Additional beverage was added to bring the volume to 50 ml, and then the solutions were stirred slowly on a magnetic stirrer for 60 minutes to yield a 2% protein w/v dispersion. The protein content of the samples was analyzed using a LECO FP528 Nitrogen Determinator then an aliquot of the protein containing beverages was centrifuged at 7800 g for 10 minutes and the protein content of the supernatant measured.

Solubility(%)=(% protein in supernatant/% protein in initial dispersion)×100

When the solubility was assessed with pH correction, the pH of the soft drink (Sprite) (3.39) and sports drink (Orange Gatorade) (3.19) without protein was measured. A sufficient amount of protein powder to supply 1 g of protein was weighed into a beaker and a small amount of beverage was added and stirred until a smooth paste formed. Additional beverage was added to bring the volume to approximately 45 ml, and then the solutions were stirred slowly on a magnetic stirrer for 60 minutes. The pH of the protein containing beverages was measured and then adjusted to the original no-protein pH with HCl or NaOH as necessary. The total volume of each solution was then brought to 50 ml with additional beverage, yielding a 2% protein w/v dispersion. The protein content of the samples was analyzed using a LECO FP528 Nitrogen Determinator then an aliquot of the protein containing beverages was centrifuged at 7800 g for 10 minutes and the protein content of the supernatant measured.

Solubility(%)=(% protein in supernatant/% protein in initial dispersion)×100

The results obtained are set forth in the following Table 20:

TABLE 20

Solubility of S500 in Sprite and Orange Gatorade

| | | no pH correction | | pH correction | |
| --- | --- | --- | --- | --- | --- |
| Batch | Product | Solubility (%) in Sprite | Solubility (%) in Orange Gatorade | Solubility (%) in Sprite | Solubility (%) in Orange Gatorade |
| S005-L17-08A | S500 | 22.5 | 50.0 | 82.0 | 79.9 |

As can be seen from the results of Table 20, the S500 was not very soluble in the beverages without pH adjustment. This can partially be attributed to the fact that the S500 is not an acidified product. Correction of the pH did improve the solubility of S500 in both beverages, although the protein was still not completely soluble.

Example 12

This Example contains an evaluation of the clarity in a soft drink and sports drink of the soy protein isolate produced by the method of Example 7 (S500).

The clarity of the 2% w/v protein dispersions prepared in soft drink (Sprite) and sports drink (Orange Gatorade) in Example 11 were assessed using the methods described in Example 10. For the absorbance measurements at 600 nm, the spectrophotometer was blanked with the appropriate beverage before the measurement was performed.

The results obtained are set forth in the following Tables 21 and 22:

TABLE 21

Clarity (A600) of S500 in Sprite and Orange Gatorade

| | | no pH correction | | pH correction | |
| --- | --- | --- | --- | --- | --- |
| Batch | Product | A600 in Sprite | A600 in Orange Gatorade | A600 in Sprite | A600 in Orange Gatorade |
| S005-L17-08A | S500 | >3.0 | >3.0 | 1.056 | 1.710 |

TABLE 22

HunterLab haze readings for S500 in Sprite and Orange Gatorade

| | | no pH correction | | pH correction | |
| --- | --- | --- | --- | --- | --- |
| Batch | Product | haze (%) in Sprite | haze (%) in Orange Gatorade | haze (%) in Sprite | haze (%) in Orange Gatorade |
| no protein | | 0.0 | 44.0 | 0.0 | 44.0 |
| S005-L17-08A | S500 | 97.5 | 98.1 | 83.6 | 98.2 |

As may be seen from the results in Tables 21 and 22, Sprite and Orange Gatorade with added S500 were very hazy, with perhaps only slight improvement achieved by correcting the pH.

SUMMARY OF THE DISCLOSURE

In summary of this disclosure, there are produced soy protein isolates which can provide heat stable and clear aqueous solutions at acid pH values. Modifications are possible within the scope of this invention.

What we claim is:

1. A process of preparing a soy protein product having a protein content of at least about 60 wt % (N×6.25) dry weight, which comprises:
    extracting a soy protein source to solubilize soy protein in the source material and to form an aqueous soy protein solution having a pH of about 5 to about 7,
    concentrating the aqueous soy protein solution to a concentration of about 50 to about 400 g/L to form a concentrated soy protein solution,
    optionally diafiltering the concentrated soy protein solution to form a concentrated and diafiltered soy protein solution,
    diluting the concentrated soy protein solution into chilled water having a temperature of less than about 15° C. to cause the formation of soy protein micelles,
    permitting the soy protein micelles to coalesce into a soy protein micellar mass,
    separating the soy protein micellar mass from the supernatant,
    acidifying the separated soy protein micellar mass to a pH of about 2.0 to about 4.0, and
    drying the separated acidified soy protein micellar mass to provide a soy protein product of at least about 60 wt % (N×6.25) d.b.

2. The process of claim 1 wherein extraction step is carried out using an aqueous monovalent salt solution such as a sodium chloride solution.

3. The process of claim 2 wherein the aqueous sodium chloride solution has a concentration of about 0.05 M to about 1.0 M.

4. The process of claim 1 wherein the aqueous salt solution contains an antioxidant.

5. The process of claim 1 wherein the aqueous soy protein solution is subject to a colour removal step prior to said concentration step.

6. The process of claim 1 wherein said extraction step is effected using water and sodium chloride is added to the aqueous soy protein solution to a concentration of about 0.05 M to about 1.0 M.

7. The process of claim 1 wherein the aqueous soy protein solution is concentrated to a concentration of about 100 to about 250 g/L.

8. The process of claim 1 wherein the aqueous soy protein solution is concentrated by ultrafiltration using a membrane having a molecular weight cut-off of about 3,000 to about 1,000,000 Daltons.

9. The process of claim 8 wherein the aqueous soy protein solution is concentrated by ultrafiltration using a membrane having a molecular weight cutoff of about 5,000 to about 100,000 Daltons.

10. The process of claim 1 wherein a diafiltration step is effected using salt solution of about the same pH and about equal or lower molarity than the extraction salt solution on the soy protein solution before or after complete concentration thereof.

11. The process of claim 10 wherein said diafiltration is effected using about 2 to about 40 volumes of diafiltration solution.

12. The process of claim 11 wherein said diafiltration is effected using about 5 to about 25 volumes of diafiltration solution.

13. The process of claim 10 wherein said diafiltration is effected using a membrane having a molecular weight cut-off of about 3,000 to about 1,000,000 Daltons.

14. The process of claim 13 wherein said diafiltration is effecting using a membrane having a molecular weight cut-off of about 5,000 to about 100,000 Daltons.

15. The process of claim 10 wherein an antioxidant is present during at least part of the diafiltration step.

16. The process of claim 1 wherein the concentrated and optionally diafiltered soy protein solution is treated with an adsorbent to remove colour and/or odour compounds.

17. The process of claim 1 wherein said concentrated and optionally diafiltered soy protein solution is subjected to a pasteurization step by heating the solution at a temperature of about 55° to about 70° C. for about 30 seconds to about 60 minutes.

18. The process of claim 17 wherein said concentrated and optionally diafiltered soy protein solution is subjected to a pasteurization step by heating the solution at a temperature of about 55° to about 70° C. for about 10 minutes to about 5 minutes.

19. The process of claim 17 wherein the resulting pasteurized, concentrated and optionally diafiltered soy protein solution is cooled to a temperature of about 25° to about 40° C. for further processing.

20. The process of claim 1 wherein said concentrated and optionally diafiltered soy protein solution is diluted about 5 to about 25 fold by the chilled water.

21. The process of claim 20 wherein the concentrated and optionally diafiltered soy protein solution is diluted about 10 to about 20 fold by the chilled water.

22. The process of claim 1 wherein the chilled water has a temperature below about 10° C.

23. The process of claim 1 wherein the separated soy protein micellar mass is acidified to a pH of about 2.9 to about 3.2 prior to drying.

24. The process of claim 1 wherein said acidified soy protein micellar mass solution is subjected to a heat treatment step to inactivate heat-labile anti-nutritional factors prior to drying.

25. The process of claim 24 wherein the anti-nutritional factors are heat-labile trypsin inhibitors.

26. The process of claim 24 wherein the heat treatment step also pasteurizes the acidified protein micellar mass solution.

27. The process of claim 24 wherein said heat-treatment is effected at a temperature of about 70° to about 100° C. for about 10 seconds to about sixty minutes.

28. The process of claim 27 wherein said heat-treatment is effected at a temperature of about 85° to about 95° C. for about 30 seconds to about 5 minutes.

29. The process of claim 24 wherein the heat-treated acidified soy protein micellar mass solution is cooled to a temperature of about 2° to about 60° C. for further processing.

30. The process of claim 29 wherein the heat-treated acidified soy protein micellar mass solution is cooled to a temperature of about 20° to about 35° C. for further processing.

31. The process of claim 10 wherein the concentration and/or optional diafiltration step are operated in a manner favourable to the removal of trypsin inhibitors.

32. The process of claim 1 wherein a reducing agent is present during the extraction step to disrupt or rearrange the disulfide bonds of trypsin inhibitors to achieve a reduction in trypsin inhibitor activity.

33. The process of claim 10 wherein a reducing agent is present during the concentration and/or optional diafiltration step to disrupt or rearrange the disulfide bonds of trypsin inhibitors to achieve a reduction in trypsin inhibitor activity.

34. The process of claim 1 wherein a reducing agent is added to the soy protein micellar mass prior to drying and/or the dried soy protein product to disrupt or rearrange the disulfide bonds of trypsin inhibitors to achieve a reduction in trypsin inhibitor activity.

35. The process of claim 1 wherein said soy protein product is an isolate having a protein content of at least about 90 wt % (N×6.25) d.b.

36. The process of claim 1 wherein said soy protein product is an isolate having a protein content of at least about 100 wt % (N×6.25) d.b.

37. The process of claim 1 wherein said soy protein product has a protein content of about 60 to about 90 wt % (N×6.25) d.b.

38. The process of claim 1 wherein the supernatant is processed to form a soy protein product having a protein content of at least about 60 wt % (N×6.25) d.b.

39. The process of claim 38 wherein the pH of the supernatant is adjusted to about 1.5 to about 4.4.

40. The process of claim 39 wherein the pH of the supernatant is adjusted to about 2.0 to about 4.0.

41. The process of claim 38 wherein said optionally pH adjusted supernatant is concentrated to a concentration of about 50 to about 400 g/L to form a concentrated supernatant which is dried to provide the soy protein product.

42. The process of claim 41 wherein said optionally pH adjusted supernatant is concentrated to a concentration of about 100 to about 250 g/L.

43. The process of claim 38 wherein the optionally pH adjusted supernatant is concentrated by ultrafiltration using a membrane having a molecular weight cut-off of about 3,000 to about 1,000,000 Daltons.

44. The process of claim 43 wherein the optionally pH adjusted supernatant is concentrated by ultrafiltration using a membrane having a molecular weight cut-off of about 5,000 to about 100,000 Daltons.

45. The process of claim 38 wherein a diafiltration step is effected using water, acidified water, dilute salt solution or an acidified, dilute salt solution on the optionally pH adjusted soy protein solution before or after complete concentration thereof.

46. The process of claim 45 wherein said diafiltration is effected using about 2 to about 40 volumes of diafiltration solution.

47. The process of claim 46 wherein said diafiltration is effected using about 5 to about 25 volumes of diafiltration solution.

48. The process of claim 45 wherein said diafiltration is effected using a membrane having a molecular weight cut-off of about 3,000 to about 1,000,000 Daltons.

49. The process of claim 48 wherein said diafiltration is effecting using a membrane having a molecular weight cut-off of about 5,000 to about 100,000 Daltons.

50. The process of claim 45 wherein an antioxidant is present dining at least part of the diafiltration step.

51. The process of claim 38 wherein the concentrated and optionally diafiltered soy protein solution is treated with an adsorbent to remove colour and/or odour compounds prior to said drying step.

52. The process of claim 38 wherein the concentrated and optionally diafiltered soy protein solution, if not already acidified, is acidified to a pH of about 2.0 to about 4x) prior to drying.

53. The process of claim 39 wherein said acidified soy protein solution is subjected to a heat treatment step to inactivate heat-labile anti-nutritional factors.

54. The process of claim 53 wherein the anti-nutritional factors are heat-labile trypsin inhibitors.

55. The process of claim 53 wherein the heat treatment step also pasteurizes the acidified aqueous protein solution.

56. The process of claim 53 wherein said heat-treatment is effected at a temperature of about 70 to about 100° C. for about 10 seconds to about sixty minutes.

57. The process of claim 56 wherein said heat-treatment is effected at a temperature of about 85° to about 95° C. for about 30 seconds to about 5 minutes.

58. The process of claim 56 wherein the heat-treated acidified soy protein solution is cooled to a temperature of about 2° to about 60° C. for further processing.

59. The process of claim 58 wherein the heat-treated acidified soy protein solution is cooled to a temperature of about 20° to about 35° C. for further processing.

60. The process of claim 45 wherein the concentration and/or optional diafiltration step are operated in a manner favourable to the removal of trypsin inhibitors.

61. The process of claim 38 wherein a reducing agent is added to the supernatant to disrupt or rearrange the disulfide bonds of trypsin inhibitors to achieve a reduction in trypsin inhibitor activity.

62. The process of claim 45 wherein a reducing agent is present during the concentration and/or optional diafiltration step to disrupt or rearrange the disulfide bonds of trypsin inhibitors to achieve a reduction in trypsin inhibitor activity.

63. The process of claim 38 wherein a reducing agent is added to the concentrated and optionally diafiltered soy protein solution prior to drying and/or the dried soy protein product to disrupt or rearrange the disulfide bonds of trypsin inhibitors to achieve a reduction in trypsin inhibitor activity.

64. The process of claim 38 wherein said soy protein product recovered from the supernatant is an isolate having a protein content of at least about 90 wt % (N×625) d.b.

65. The process of claim 38 wherein said soy protein product recovered from the supernatant is an isolate having a protein content of at least about 100 wt % (N×625) d.b.

66. The process of claim 38 wherein said soy protein product recovered from the supernatant has a protein content of about 60 to about 90 wt % (N×625) d.b.

* * * * *